(12) United States Patent
Wiseman

(10) Patent No.: US 9,303,687 B1
(45) Date of Patent: Apr. 5, 2016

(54) ADJUSTABLE BEARING CUP

(71) Applicant: Allen L. Wiseman, Tarpon Springs, FL (US)

(72) Inventor: Allen L. Wiseman, Tarpon Springs, FL (US)

( * ) Notice: Subject to any disclaimer, the term of this patent is extended or adjusted under 35 U.S.C. 154(b) by 0 days.

(21) Appl. No.: 14/183,839

(22) Filed: Feb. 19, 2014

Related U.S. Application Data

(60) Provisional application No. 61/768,099, filed on Feb. 22, 2013.

(51) Int. Cl.
*F16C 23/06* (2006.01)
*F16C 25/06* (2006.01)
*F16C 35/07* (2006.01)

(52) U.S. Cl.
CPC .............. *F16C 23/06* (2013.01); *F16C 25/06* (2013.01); *F16C 35/07* (2013.01); *F16C 2229/00* (2013.01)

(58) Field of Classification Search
CPC .......... F16C 23/06; F16C 23/08; F16C 25/06; F16C 25/08; F16C 25/083; F16C 35/07
USPC ......................................................... 384/583
See application file for complete search history.

(56) References Cited

U.S. PATENT DOCUMENTS

| | | | | |
|---|---|---|---|---|
| 1,183,283 A * | 5/1916 | Dodge | ........................... | 384/583 |
| 1,259,751 A * | 3/1918 | Kuhn | ........................... | 384/583 |
| 1,363,705 A * | 12/1920 | Andrus | ........................... | 384/519 |
| 1,631,557 A * | 6/1927 | Sponable | ........................... | 384/583 |
| 2,589,560 A * | 3/1952 | Lloyd | ........................... | 384/563 |
| 3,003,836 A * | 10/1961 | Hill | ........................... | 384/455 |
| 3,193,028 A * | 7/1965 | Radzimovsky | ........................... | 175/372 |
| 3,260,132 A * | 7/1966 | West et al. | ........................... | 74/609 |
| 3,549,220 A * | 12/1970 | Robinson et al. | ........................... | 384/535 |
| 3,578,829 A * | 5/1971 | Hata et al. | ........................... | 384/458 |
| 4,136,748 A * | 1/1979 | Dickerhoff | ........................... | 175/337 |
| 4,191,042 A * | 3/1980 | Salter, Jr. | ........................... | 72/247 |
| 4,233,855 A * | 11/1980 | Olschewski et al. | ........................... | 74/396 |
| 4,240,677 A * | 12/1980 | Payne et al. | ........................... | 384/252 |
| 4,273,391 A * | 6/1981 | Asberg | ........................... | 384/494 |
| 6,015,264 A * | 1/2000 | Violette et al. | ........................... | 416/146 A |
| 6,158,895 A * | 12/2000 | Date | ........................... | 384/493 |
| 6,357,927 B1 * | 3/2002 | Myers et al. | ........................... | 384/563 |
| 6,425,690 B1 * | 7/2002 | DeWachter | ........................... | 384/583 |
| 7,108,428 B2 * | 9/2006 | Ason et al. | ........................... | 384/583 |
| 7,393,141 B2 * | 7/2008 | Fahrni et al. | ........................... | 384/583 |
| 7,762,725 B2 * | 7/2010 | Fahrni et al. | ........................... | 384/583 |
| 7,794,153 B2 * | 9/2010 | Szczepanski et al. | ........................... | 384/583 |
| 8,616,780 B2 * | 12/2013 | Kwasniewski et al. | ........................... | 384/583 |
| 2003/0189382 A1 * | 10/2003 | Tornquist et al. | ........................... | 310/90 |
| 2005/0063629 A1 * | 3/2005 | Fahrni et al. | ........................... | 384/583 |
| 2011/0103731 A1 * | 5/2011 | Fahrni et al. | ........................... | 384/572 |
| 2012/0295753 A1 * | 11/2012 | Kwon | ........................... | 475/246 |
| 2013/0343691 A1 * | 12/2013 | Kwasniewski et al. | ........................... | 384/583 |

\* cited by examiner

*Primary Examiner* — Alan B Waits

(57) ABSTRACT

A bearing cup has an axis and is formed with an interior surface and an exterior surface. The exterior surface has a first extent and a second extent. A plurality of grooves are formed in the exterior surface of the first extent. Screw threads are formed in the exterior surface of the second extent. An adjusting collar has an axis with an inside diameter formed with screw threads received on the screw threads of the bearing cup. The adjusting collar has an outside diameter essentially equal to the diameter of the major extent. A plurality of grooves are formed in the adjusting collar. The adjusting collar forms an annular thrust surface perpendicular to the axis. The annular thrust surface is axially adjustable with respect to the bearing cup. A locking pin is positioned within aligned grooves in the bearing cup and adjustable collar.

4 Claims, 6 Drawing Sheets

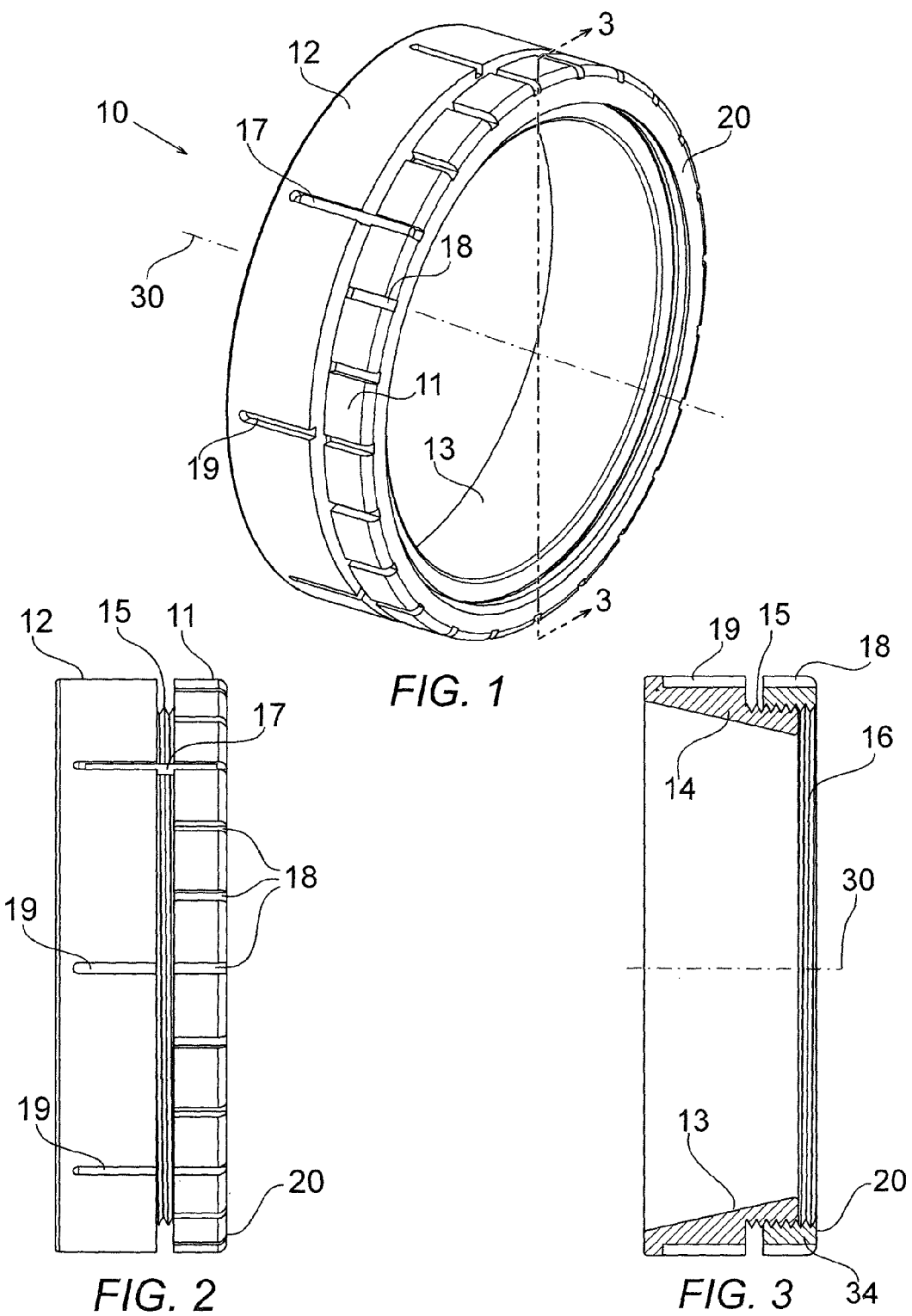

ADJUSTABLE BEARING CUP

BACKGROUND OF THE INVENTION

1. Related Application

This application is based upon Provisional Application Ser. No. 61/768,099 filed Feb. 22, 2013, the subject matter of which is incorporated herein by reference.

2. Field of the Invention

This invention relates generally to a bearing assembly, in particular, to a bearing with an adjustable size for locating a rotating assembly relative to its bearings thrust surface, and for producing and maintaining preload on bearings.

DESCRIPTION OF THE PRIOR ART

The bearings that support a rotating assembly are commonly positioned and or preloaded by shims, or adjustors that are designed as part of their housing. These devices, which position the rotating assemblies and preload the bearings, can affect bearing life, heat generation, operating efficiency, gear mesh and many other factors. Of the different devices used, adjuster nuts provide the easiest and quickest method for locating a rotating assembly, and setting the bearing preload at its installation and later while in service.

Shims may involve special tooling used spreading the housing that the rotating assembly is mounted in, and shimming for proper position and preload can be a difficult processes many times ending up with a time consuming trial and error approach.

In contrast to shims, the use of adjustor nuts allows a simple rotation of the adjuster nut to set correct preload and or position. However, most rotating assembly housings are not designed for the use of adjustor nuts, due to the cost of manufacturing or difficulty of access for adjustment.

SUMMARY OF THE INVENTION

An adjustable bearing cup assembly that can be adjusted to place its rotating assembly in proper position, and or set proper pre-load for operation, eliminates the need for precise shimming. The bearing cup assembly is comprised of: a bearing race with an opposed partially threaded circumference, a threaded collar, and a locking device. The race and collar are threaded with mating threads and are screwed together. When the threaded collar is rotated about the mating threads of the race it will dimensionally change the size of the cup and collar assembly in a direction parallel to the rotational axis, forcing movement of the bearings rotating assembly into a desired position, and or adjusting the bearing pre load. The outer most circumferences of both the race and collar are diametrically equal and have multiple grooves that are cut or recessed parallel to the rotating axis of bearing assembly. The multiple grooves in the race and collar assembly are of the same dimensions in depth and width, and can be used to rotate the cone and collar assembly about their mating threads to the desired position.

The cup assembly, once adjusted to its desired position can then be locked by aligning the grooves in the collar, to the nearest grooves in the race. With the race and collar grooves aligned, a pin having a small interference fit is placed across both the groove in the race and collar, locking the race and collar from any axial rotation with relationship to each other. The groove in the race is not extended thru the bearing end of the race limiting the locking pins ability to move out of position laterally with respect to the rotational axis, and disengage from the collar. The locking pin is long enough to remain engaged in the race if the pin where to be move laterally with respect to rotational axis to extend thru the collars end, to the bearings assemblies thrust surface. The bearing assemblies housing will capture the pin in its groove radially maintaining a secure lock.

DESCRIPTION OF THE DRAWINGS

The invention will be more readily understood by reference to the following description, taken with the accompanying drawings.

FIG. 1 is a perspective view of an adjustable bearing cup assembly and its locking pin, shown partially expanded along its rotating axis.

FIG. 2 is an end view of the assembly shown in FIG. 1.

FIG. 3 is a cross sectional view of the assembly shown in FIG. 1 taken at a diametric plane, dissecting its rotational axis along line 3-3.

DESCRIPTION OF THE PREFERRED EMBODIMENT

Figure 4:
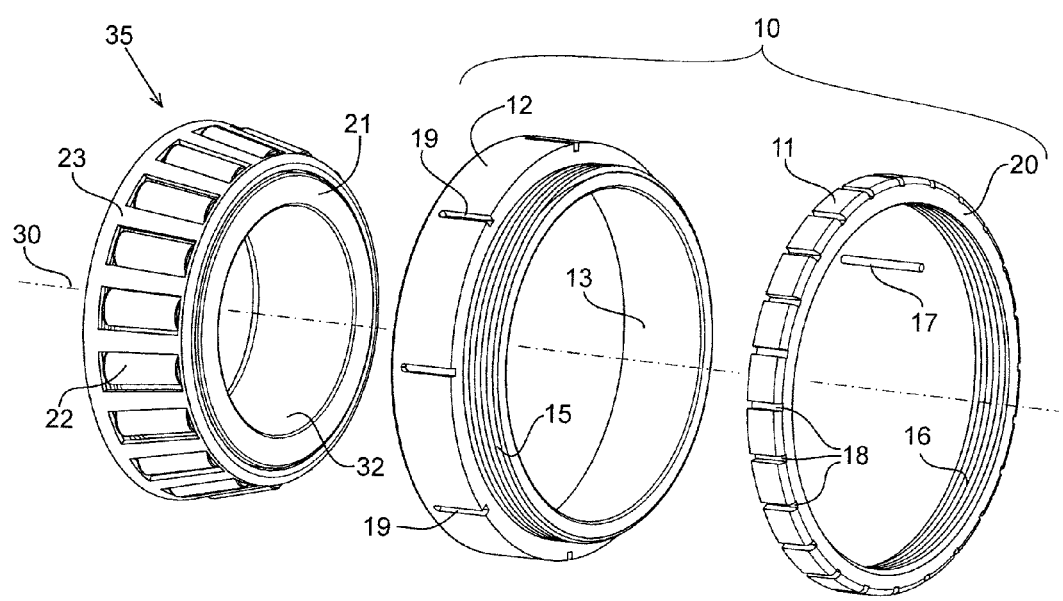
FIG. 4 is an exploded perspective view of the assembly shown in FIG. 1 with a mating bearing cone, roller, and cage assembly.

The following description of the preferred embodiment(s) is merely exemplary in nature and is in no way intended to limit the scope of the invention, but rather to enable any person skilled in the art, to make use of its features.

With initial reference to FIGS. 1, 2, 3 and 4 an adjustable bearing cup and lock assembly constructed in accordance with this description of the embodiment, the present invention is generally identified at reference numeral 10.

Referring now to the drawings, illustrated in FIGS. 1-4 an adjustable bearing cup and lock assembly 10 where in the bearing cup 14 constructed of suitable material and hardness for its application, consists of a threaded feature 15, and a plurality of annular groves 19 recessed diametrically from its outer diameters surface 12, and a collar 34 consisting of a threaded feature 16 and a plurality of annular groves 18 recessed diametrically from its outer diameters surface 11.

The bearing cone 21 and adjusting collar 34 are assembled concentrically about an axis 30, with the bearing cups threaded feature 15 and the adjusting collars mating threaded feature 16. Rotating the assembled adjusting collar 34 about its axis 30 with relation to the bearing cup 14 will allow the total width of the assembly to expand or contract along axis 30 within the confines of its limits.

After setting the desired width for the assembly of the adjusting collar 34, and the bearing cup 14, a minimal adjustment or rotation of the adjusting collar 34 with relation to bearing cup 14 may be necessary to align the adjusting collar locking pin groove(s) 18 with the bearing cup locking pin groove(s) 19. With the grooves 18 and grooves 19 aligned, the locking pin 17 can be placed within the aligned set(s) of groves.

The locking pin 17 is diametrically sized, to fit within the width of grooves 18 and 19 for which it is placed, with a fit that will precluded the rotation of the adjusting collar 34 with relation to the bearing cup 14 therefor maintaining its adjustment, or width, along axis 30. The locking pin 17 length is long enough to fully engage in both the bearing cup locking pin groove 19 and the adjusting collar locking pin groove 18 when adjusted to any position within the confines of its limits.

The adjustable bearing cup and lock assembly 10 is designed to be mated with a bearing cone assembly 35, consisting of a bearing cone 21, a set of tapered rollers 22, and a tapered roller bearing cage 23. The two assemblies mated together will make up a typical tapered roller bearing with adjustable means for setting its preload and or position for it rotating assembly.

Figure 5:
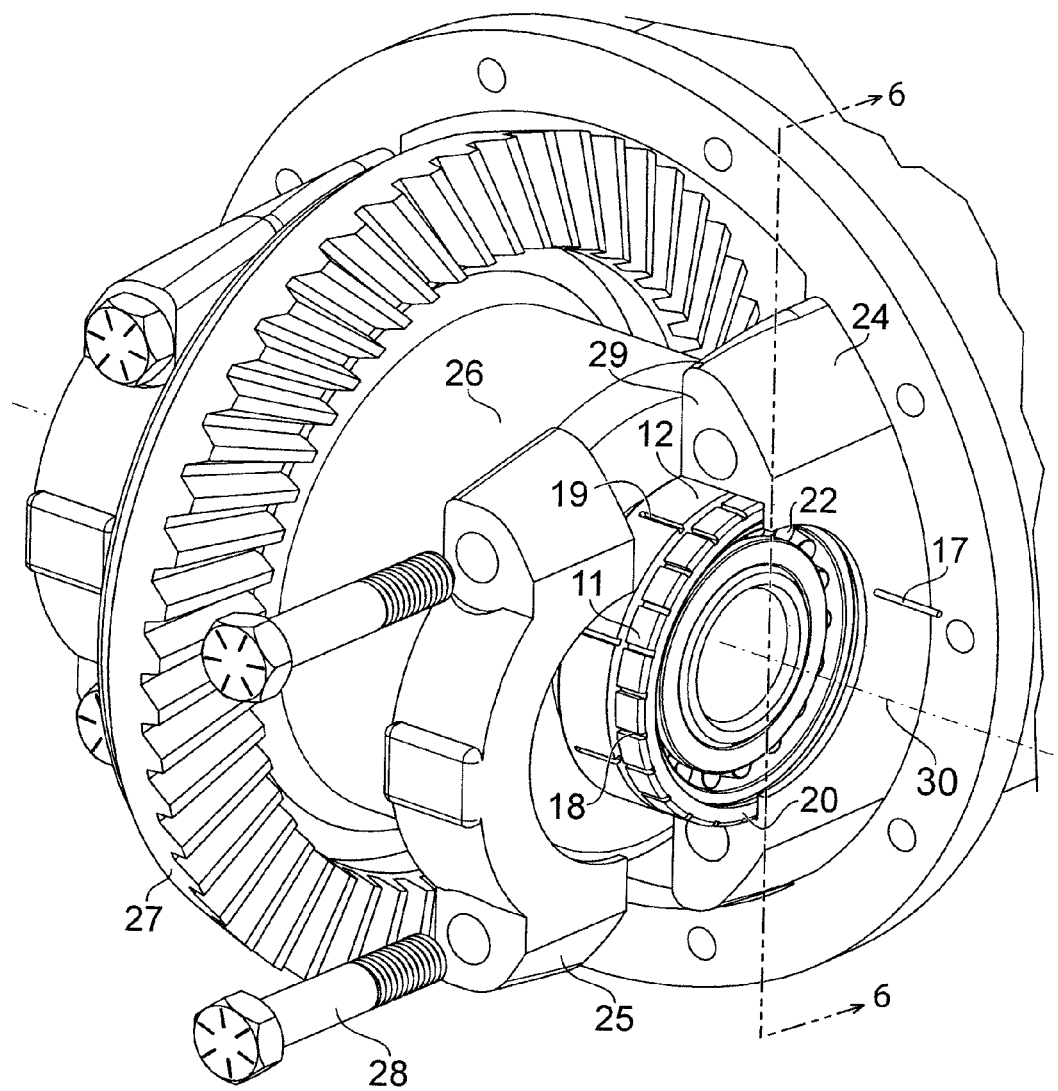
FIG. 5 is an assembled perspective view of FIG. 4 shown in a partially exploded view of a typical installation, showing the assemblies housing, rotating assembly, and locking pin.
Figure 6:
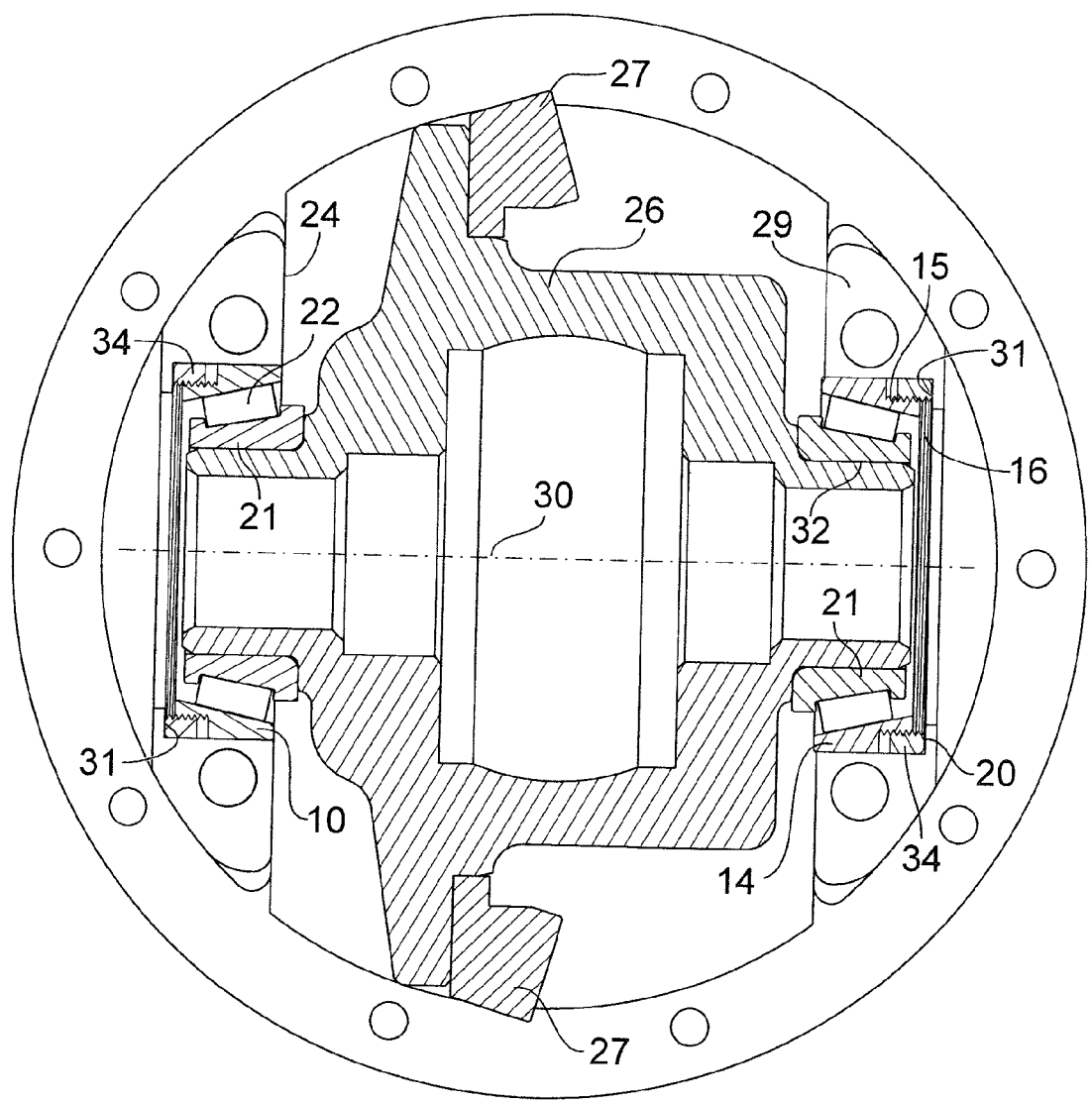
FIG. 6 is a cross sectional view of FIG. 5 taken along line 6-6 dissecting its rotating axis.
Figure 7:
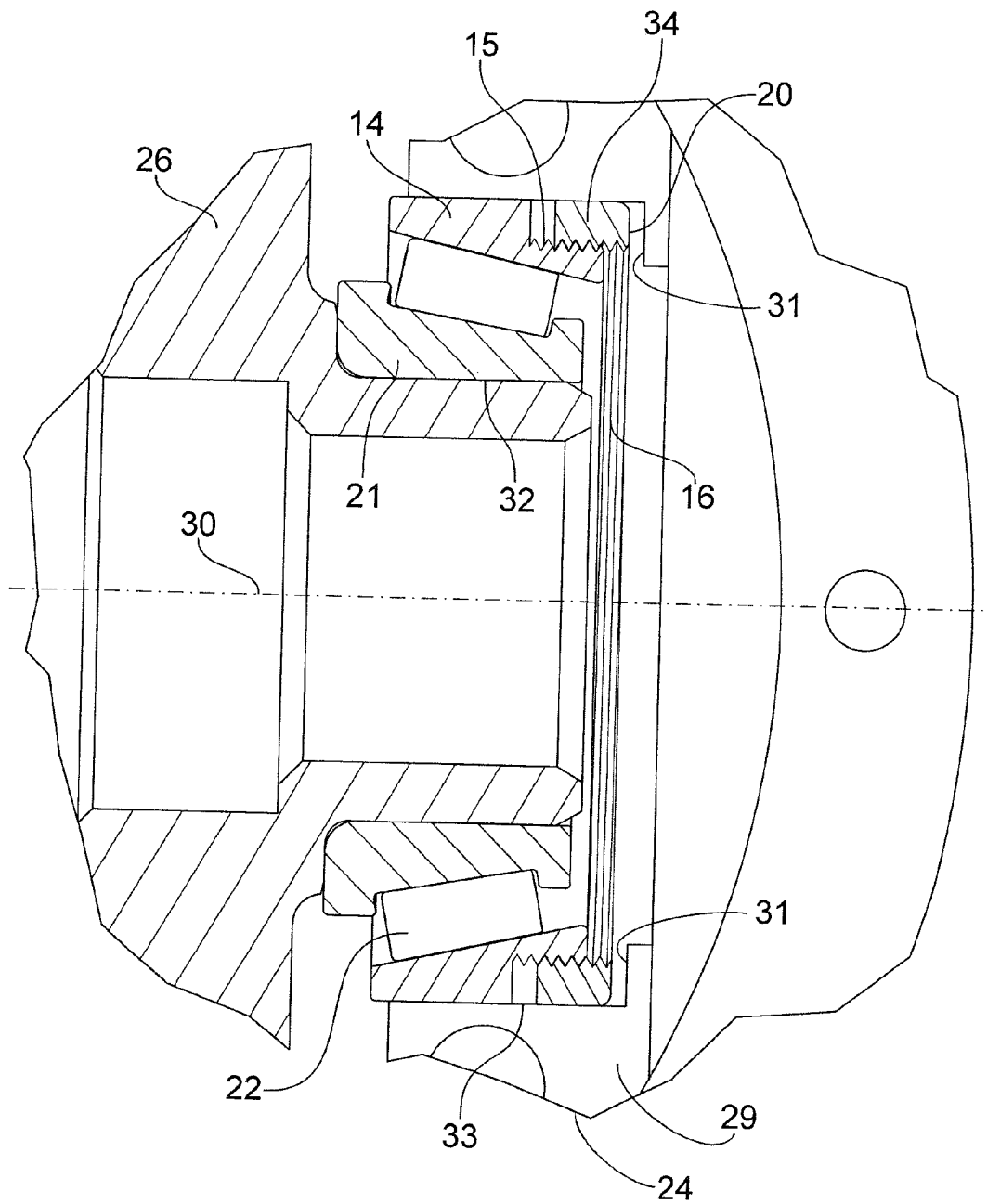
FIG. 7 is a magnified detail view of FIG. 6 detailing the adjustable bearing assembly, partially expanded along its rotating axis, and its mating parts.

With continued references to FIGS. 1-4 and further references to FIGS. 5-7 the adjustable bearing cup and lock assembly 10 will be further described in an exemplary differential and housing assembly showing its functionality and features. The adjustable bearing cup and lock assembly 10 is provided to assure optimum differential bearing preload and proper pinion gear to ring gear engagement. The exemplary differential and housing assembly having a pair of bearing cone assemblies 35 pressed on the bearing journals, 36 on each end of its rotating axis 30, with an interference fit between the bearing cones bore 32 and the bearing journals 36. The bearing cone assemblies 35 on each end of the rotating assembly 26 will have a mating adjustable bearing cup and lock assembly 10 with the outer bearing race 13 contacting the bearing cone assemblies 35 tapered rollers 22. The installed adjustable bearing cup and lock assemblies 10 fitted within the housings 24 thrust load surfaces 31 with the bearing cups outer surface 12 mating with the bearing seats 33 shown in FIG. 8.

With particular referenced to FIGS. 6 and 7 the adjusting feature will be explained in greater detail. Rotating the adjusting collar 34 about its mating threads of the bearing cup 14 will force the adjusting collars thrust surface 20 to move laterally along its axis 30 in relation to the housings thrust surface 31. With the adjustable bearing cup and lock assemblies 10 adjusted until the adjusting collars thrust surface 20 contacts the housings thrust surface 31 as illustrated in on both ends of the exemplary differential assembly FIG. 6, the rotating assembly 26 is held in position latterly along its axis 30. Further adjustments can be used to move the rotating assembly 26 and gear 27 laterally along axis 30 to properly position ring gear 27 in relation to its mating pinion gear commonly known as backlash. Additionally further adjustments can be used to force the outer bearing race 13 to properly seat against its bearing cone assembly 35 commonly known as bearing preload.

Figure 8:
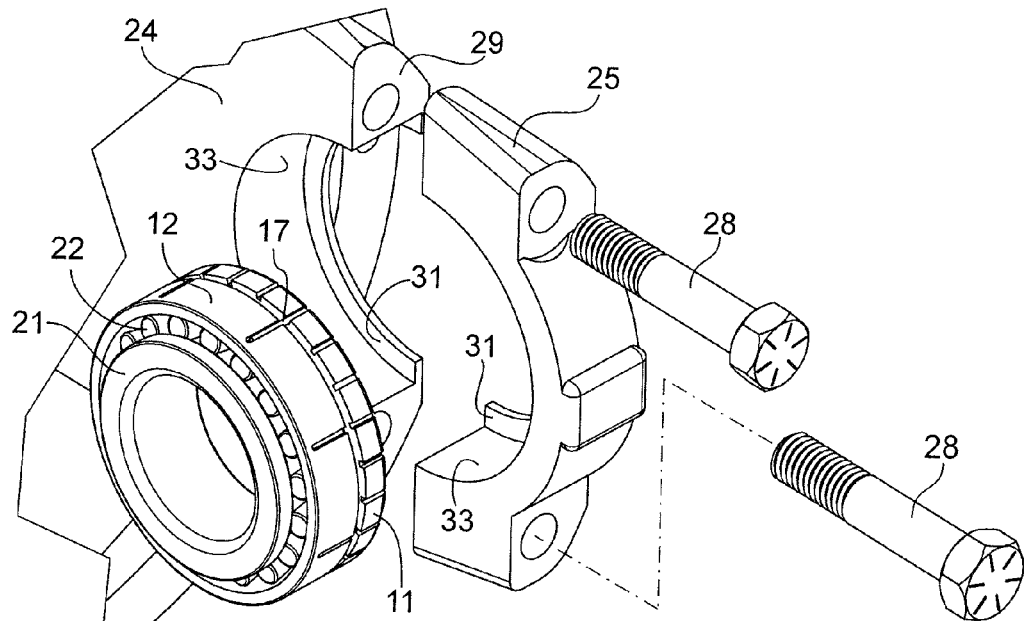
FIG. 8 is a detail perspective view an adjustable bearing cone and cup assembly, with an exploded view of a typical bearing housing showing its bearing seat, thrust surface, and bearing cap.
Figure 9:
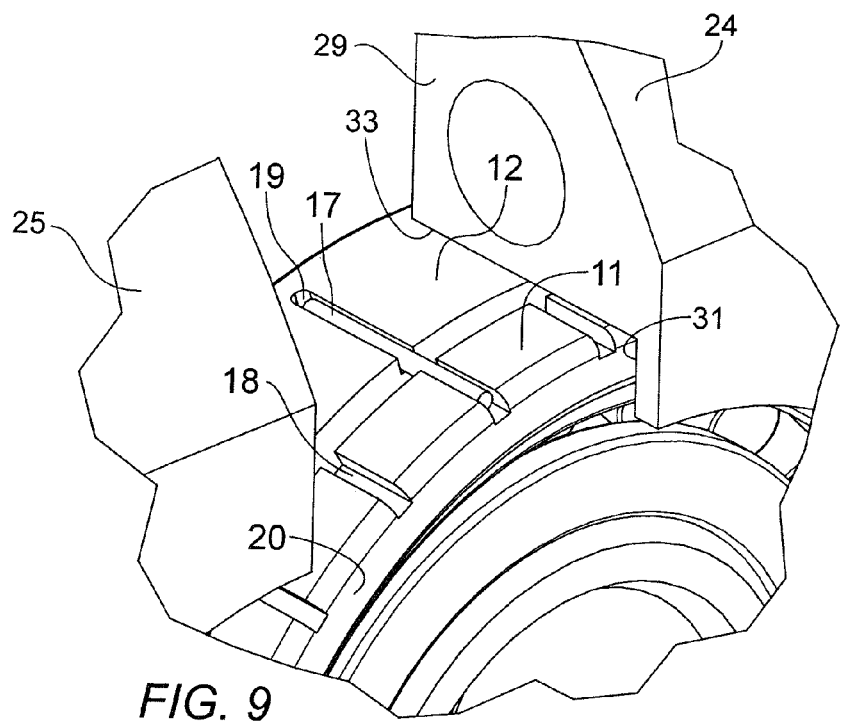
FIG. 9 is a detail perspective view of the assembly in FIG. 1 shown in an exploded view of a typical housing installation, detailing the locking pin installed in lock position.

Now referring to FIGS. 8 and 9, the locking feature of the adjustable bearing cup and lock assembly 10 will be further described. After previously described adjustments have been made to the adjustable bearing cup and lock assembly 10 and the locking pin grooves 18 and grooves 19 have been aligned as previously described. The locking pin 17 placed in the aligned grooves will be captured radially in this exemplary differential assembly by its bearing cap 25 being placed on its mating surfaces 29 and properly secured into position with bolts 28 making an interference fit between the housing bearing seats 33 and the bearing cup outer surface 12 and between the housing bearing seats 33 and the adjusting collar outer surface 11. The locking pin 17 is additionally captured along its axis by the housings thrust surface 31 and closed end of the bearings cups locking pin groove 19.

From the foregoing, is should be appreciated that the present invention is an adjustable bearing cup assembly. A bearing cup has an axis and is formed with an interior surface and an exterior surface. The exterior surface has a first extent and a second extent. A plurality of grooves are formed in the exterior surface of the first extent. Screw threads are formed in the exterior surface of the second extent. An adjustment collar has an axis with an inside diameter formed with screw threads received on the screw threads of the bearing cup. The adjustment collar has an outside diameter essentially equal to the diameter of the major extent. A plurality of grooves are formed in the adjustment collar. The adjustment collar forms an annular thrust surface perpendicular to the axis. The annular thrust surface is axially adjustable with respect to the bearing cup. A locking pin is positioned within aligned grooves in the bearing cup and adjustable collar. The interior surface of the bearing cup has a frusto-conical configuration. Further included is a bearing cone assembly with tapered bearings in rotational contact with the interior surface of the bearing cup.

From a specific standpoint, it should be appreciated that the present invention is a bearing assembly 10 having an axially adjustable bearing thrust surface 20 for producing and maintaining a preload on bearings. The bearing assembly includes a bearing cup 14 and an adjusting collar 34 having a common horizontal axis of rotation 30.

The bearing cup 14 has an annular configuration with an interior surface and an exterior surface. The interior surface has a frusto-conical configuration. The interior and exterior surfaces extend along the common horizontal axis of rotation 30. The bearing cup has an annular inner face perpendicular to the common horizontal axis of rotation. The bearing cup has an annular outer face perpendicular to the common horizontal axis of rotation. The bearing cup has a fixed bearing cup length measured between the annular inner and outer faces. The interior surface has a first inner diameter adjacent to the annular inner face. The interior surface has a second inner diameter adjacent to the annular outer face. The first inner diameter is greater than the second inner diameter. The exterior surface has a major extent with a first outer diameter adjacent to the annular inner face. The exterior surface has a minor extent with a second outer diameter adjacent to the annular outer face. The first outer diameter is greater than the second outer diameter. Eight generally rectilinear grooves 19 are formed in the major extent of the exterior surface equally spaced from each other and parallel with the horizontal common axis of rotation. Male screw threads 15 are formed in the exterior surface of the minor extent.

The adjusting collar 34 has an annular configuration with an axial length. The adjusting collar has an inside diameter with female screw threads 16 threadedly received on the male screw threads of the minor extent of the exterior surface of the bearing cup. The adjusting collar has an outside diameter essentially equal to the first exterior diameter of the major extent of the exterior surface. Twenty four generally rectilinear grooves 18 are formed in the outside diameter of the adjusting collar equally spaced from each other and parallel with the horizontal common axis of rotation. The adjusting collar forms the bearing thrust surface 20 perpendicular to the horizontal common axis of rotation. The bearing thrust surface is axially adjustable with respect to the bearing cup.

A cylindrical locking pin 17 is positioned within the axially aligned generally rectilinear grooves in the bearing cup and adjustable collar to maintain the bearing cup and adjusting collar in an intended rotational orientation and the bearing thrust surface at an intended axial orientation with respect to the bearing cup.

Lastly, a bearing cone assembly 35 with tapered bearings 22 in rotational contact with the interior surface of the bearing cup is provided.

In accordance with the provisions of the patent statutes, the preferred embodiment has been described. However it should be noted that the alternate embodiments can be practiced otherwise than as specifically illustrated and described.

What is claimed is:

1. A bearing assembly comprising:
a bearing cup having an axis and formed with an interior surface and an exterior surface, the exterior surface having a first extent and a second extent, a plurality of grooves in the exterior surface of the first extent, screw threads formed in the exterior surface of the second extent;
an adjusting collar having an axis with an inside diameter with screw threads received on the screw threads of the bearing cup, the adjusting collar having an outside diameter equal to the diameter of the exterior surface of the first extent, a plurality of grooves in the adjusting collar, the adjusting collar forming an annular thrust surface perpendicular to the axis, the annular thrust surface being axially adjustable with respect to the bearing cup; and
a locking pin positioned within aligned grooves in the bearing cup and adjustable collar.

2. The bearing assembly as set forth in claim 1 wherein the interior surface of the bearing cup has a frusto-conical configuration.

3. The bearing assembly as set forth in claim 2 and further including:
a bearing cone assembly with tapered bearings in rotational contact with the interior surface of the bearing cup.

4. A bearing assembly (10) having an axially adjustable bearing thrust surface (20) for producing and maintaining a preload on bearings, the bearing assembly comprising, in combination:
a bearing cup (14) and an adjusting collar (34) having a common horizontal axis of rotation (30);
the bearing cup (14) having an annular configuration with an interior surface and an exterior surface, the interior surface having a frusto-conical configuration, the interior surface and the exterior surface extending along the common horizontal axis of rotation (30), the bearing cup having an annular inner face perpendicular to the common horizontal axis of rotation, the bearing cup having an annular outer face perpendicular to the common horizontal axis of rotation, the bearing cup having a fixed bearing cup length measured between the annular inner face and annular outer face, the interior surface having a first inner diameter adjacent to the annular inner face, the interior surface having a second inner diameter adjacent to the annular outer face, the first inner diameter being greater than the second inner diameter, the exterior surface having a major extent with a first outer diameter adjacent to the annular inner face, the exterior surface having a minor extent with a second outer diameter adjacent to the annular outer face, the first outer diameter being greater than the second outer diameter, eight grooves (19) formed in the major extent of the exterior surface, the grooves being equally spaced from one another and parallel with the horizontal common axis of rotation, male screw threads (15) formed in the minor surface of the exterior surface;
the adjusting collar (34) having an annular configuration with an axial length, the adjusting collar having an inside diameter with female screw threads (16) threadedly received on the male screw threads of the minor extent of the exterior surface of the bearing cup, the adjusting collar having an outside diameter essentially equal to the first exterior diameter of the major extent of the exterior surface, twenty four grooves (18) formed in the outside diameter of the adjusting collar equally spaced from each other and parallel with the horizontal common axis of rotation, the adjusting collar forming the bearing thrust surface (20) perpendicular to the horizontal common axis of rotation, the bearing thrust surface being axially adjustable with respect to the bearing cup;
a cylindrical locking pin (17) positioned within the grooves (19) in the bearing cup and the grooves (18) in the adjustable collar, the grooves (19) and the grooves (18) being axially aligned, to maintain the bearing cup and adjusting collar in an intended rotational orientation and the bearing thrust surface (20) at an intended axial orientation with respect to the bearing cup; and
a bearing cone assembly (35) with tapered rollers (22) in rotational contact with the interior surface of the bearing cup (12).

* * * * *